United States Patent

Rath et al.

[11] Patent Number: 6,133,209
[45] Date of Patent: Oct. 17, 2000

[54] POLYOLEFINS AND THEIR FUNCTIONALIZED DERIVATIVES

[75] Inventors: Hans Peter Rath, Grünstadt; Irene Trötsch-Schaller, Bissersheim; Dietmar Posselt, Heidelberg; Bernhard Geissler, Kirchheim; Johann-Peter Melder, Neuhofen; Joachim Rösch, Ludwigshafen, all of Germany

[73] Assignee: BASF Aktiengesellschaft, Ludwigshafen, Germany

[21] Appl. No.: 09/297,633

[22] PCT Filed: Nov. 3, 1997

[86] PCT No.: PCT/EP97/06068

§ 371 Date: Jul. 27, 1999

§ 102(e) Date: Jul. 27, 1999

[87] PCT Pub. No.: WO98/20053

PCT Pub. Date: May 14, 1998

[30] Foreign Application Priority Data

Nov. 4, 1996 [DE] Germany ................ 196 45 430

[51] Int. Cl.$^7$ .................... C10M 133/52; C10L 1/22; C08F 8/30; C08F 4/14
[52] U.S. Cl. ................... 508/448; 508/496; 508/500; 508/501; 508/545; 508/558; 508/561; 44/384; 44/388; 44/391; 44/412; 44/434; 526/237; 526/348; 526/348.7; 585/510; 585/525
[58] Field of Search ............... 508/448; 44/388; 526/237; 585/510, 525

[56] References Cited

U.S. PATENT DOCUMENTS

| | | | |
|---|---|---|---|
| 3,907,922 | 9/1975 | Heilman et al. | 260/683 |
| 4,044,039 | 8/1977 | Devries | 260/453 |
| 4,152,499 | 5/1979 | Boerzel et al. | 526/52 |
| 4,814,540 | 3/1989 | Watanabe et al. | 585/523 |
| 4,832,702 | 5/1989 | Kummer et al. | 44/62 |
| 4,859,210 | 8/1989 | Franz et al. | 44/53 |
| 5,068,490 | 11/1991 | Eaton | 585/525 |
| 5,087,788 | 2/1992 | Wu | 585/512 |
| 5,097,087 | 3/1992 | Sanderson et al. | 585/255 |
| 5,191,044 | 3/1993 | Rath et al. | 526/212 |
| 5,286,823 | 2/1994 | Rath | 526/237 |
| 5,321,189 | 6/1994 | Mueller et al. | 585/512 |
| 5,408,018 | 4/1995 | Rath | 526/237 |
| 5,437,695 | 8/1995 | Mohr et al. | 44/418 |
| 5,492,641 | 2/1996 | Mohr et al. | 252/50 |
| 5,530,127 | 6/1996 | Reif et al. | 544/106 |
| 5,746,786 | 5/1998 | Mueller et al. | 44/412 |
| 5,910,550 | 6/1999 | Rath | 526/237 |
| 5,945,575 | 8/1999 | Sigwart et al. | 585/531 |
| 5,962,604 | 10/1999 | Rath | 526/65 |

FOREIGN PATENT DOCUMENTS

| | | |
|---|---|---|
| 2050967 | 3/1992 | Canada . |
| 2057273 | 6/1992 | Canada . |
| 2081853 | 5/1993 | Canada . |
| 4330971 | 3/1995 | Germany . |
| 961903 | 6/1964 | United Kingdom . |
| 85/01942 | 5/1985 | WIPO . |
| 92/12221 | 7/1992 | WIPO . |
| 92/14806 | 9/1992 | WIPO . |
| 94/24231 | 10/1994 | WIPO . |

OTHER PUBLICATIONS

Rossenbeck, *Katalysatoren, Tenside, Mineraloladditive*, 1978, pp. 223–229 (plus English abstract).

*Primary Examiner*—Ellen M. McAvoy
*Attorney, Agent, or Firm*—Keil & Weinkauf

[57] ABSTRACT

The present invention relates to at least simply unsaturated polyolefins with a number mean molecular weight in the range of 400 to 1,500 dalton and a dispersibility of $M_W/M_N<1.2$, obtained through catalytic dimerization from at least simply unsaturated olefin-oligomers, as well as to the method for their production. The present invention further relates to derivatives of these polyolefins which can be obtained by functionalizing at least a double link of the polyolefin. The invention also relates to the use of polyolefins and/or functionalization products as additives for fuels or lubricants.

19 Claims, No Drawings

POLYOLEFINS AND THEIR FUNCTIONALIZED DERIVATIVES

The present invention relates to monoolefinically unsaturated polyolefins and their functionalized derivatives and their use as fuel and lubricant additives or as additive concentrates.

Carburetors and intake systems of gasoline engines, as well as injection systems for metering fuel in gasoline and diesel engines, are increasingly being contaminated by impurities. The impurities are caused by dust particles from the air sucked in by the engine, hot exhaust gases from the combustion chamber, the crankcase vent gases passed into the carburetor and high boilers and stabilizers from the fuels.

These residues shift the air/fuel ratio during a cold start, during idling and in the lower part-load range so that the mixture is difficult to adjust and the combustion becomes more incomplete. As a result of this, the proportion of uncombusted or partially combusted hydrocarbons in the exhaust gas and the gasoline consumption increase.

It is known that fuel additives for keeping valves and carburetor or injection systems clean are used for avoiding these disadvantages (cf. for example: M. Rossenbeck in Katalysatoren, Tenside, Mineralöladditive, Editors J. Falbe, U. Hasserodt, page 223, G. Thieme Verlag, Stuttgart 1978). Depending on the mode of action and preferred place of action of such detergent additives, a distinction is now made between two generations. The first generation of additives was able only to prevent the formation of deposits in the intake system but not to remove existing deposits. On the other hand, the additives of the second generation can prevent and eliminate deposits (keep-clean- and clean-up-effect). This is permitted in particular by their excellent heat stability in zones of relatively high temperature, in particular in the intake valves.

The molecular structure principle of these additives of the second generation which act as detergents is based on the linkage of polar structures with generally higher molecular weight, nonpolar or olephilic radicals. However, it has also been found that polyolefins themselves are suitable for this purpose, provided that they have suitable molecular weights.

Typical functionalized polyolefins are the polyalkyleneamines (cf. for example EP-A 244 616, EP-A 476 485, EP 539 821, WO 92/12221, WO 92/14806, WO 94/24231 or German patent 3,611,230). Also suitable are derivatives of these amines, for example the β-aminonitriles of the general formula

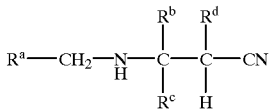

where $R^a$ is an aliphatic hydrocarbon radical having alkyl side groups and a number average molecular weight $\overline{M}_N$ from 250 to 5000 and $R^b$, $R^c$ and $R^d$ independently of one another, are each hydrogen or $C_1$–$C_8$-alkyl or $R^b$ or $R^d$ is phenyl. Such compounds are described, for example, in EP-A 568 873.

Hydroxyl-functionalized polyolefins (cf. for example EP-A 277 345 and the literature cited there) and their derivatives which are obtainable by functionalization of the OH group are also suitable.

A further class of additives comprises the polyalkyl-substituted succinic anhydrides and their derivatives (cf. for example DE-A 27 02 604).

All derivatives mentioned are obtained by functionalization of polyolefins which also contain a reactive double bond. It has been found that polyolefins having molecular weights below 400 dalton and their functionalized derivatives have only small cleaning effects, whereas polyolefins having molecular weights above 1500 dalton and their derivatives tend to cause jamming of valves. A narrow molecular weight distribution of the polyolefins, characterized by a dispersity $\overline{M}_W/\overline{M}_N < 2$ (ratio of weight average molecular weight $\overline{M}_W$ to number average molecular weight $\overline{M}_N$), is advantageous since the higher molecular weight range is not so pronounced in the case of a low dispersity.

The prior art discloses that monoethylenically unsaturated polyolefins having molecular weights of from 400 to 1500 dalton and a dispersity down to a lower limit of 1.4 can be prepared by cationic polymerization. Even narrower molecular weight distributions ($\overline{M}_W/\overline{M}_N$: 1.2–1.4) can be achieved by anionic polymerization and living cationic polymerization. Polyolefins having a narrower molecular weight distribution $\overline{M}_W/\overline{M}_N < 1.2$ are in principle obtainable by distillation methods, but only compounds having a molecular weight of <400 dalton ($C_{28}$) can be obtained in this way. Monoethylenically unsaturated polyolefins having molecular weights above 400 dalton and a dispersity $\overline{M}_W/\overline{M}_N < 1.2$ are unknown todate. The same therefore applies to the functionalized polyolefins obtainable from them.

For example, U.S. Pat. No. 5,286,823 describes monoethylenically unsaturated polyisobutenes having molecular weights of from 500 to 5000 dalton in combination with a dispersity $\overline{M}_W/\overline{M}_N < 2$. In the examples, a polyisobutene having a number average molecular weight $\overline{M}_N$ of 840 dalton with $\overline{M}_W/\overline{M}_N = 1.3$ is disclosed.

U.S. Pat. No. 5,068,490 describes a process for the preparation of polyisobutenes having at least 80 mol % of vinylidene double bonds. The polyisobutenes obtained have on average molecular weights of from 240 to 2800 in combination with dispersities $\overline{M}_W/\overline{M}_N$ of from 1.26 to 2.29.

EP-A 490 454 describes propyleneoligomers having number average molecular weights of from 700 to 5000 dalton and dispersities $\overline{M}_W/\overline{M}_N$ of from 1.5 to 4.0.

It is an object of the present invention to provide monoethylenically unsaturated polyolefins which have molecular weights of from 400 to 1500 dalton in combination with a dispersity $\overline{M}_W/\overline{M}_N < 1.2$.

We have found that this object is achieved and that, surprisingly, monoethylenically unsaturated polyolefins having a dispersity $\overline{M}_W/\overline{M}_N < 1.2$ are obtainable by acid-catalyzed dimerization of monoethylenically unsaturated oligoolefins having a dispersity $\overline{M}_W/\overline{M}_N < 1.4$.

The present invention therefore relates to polyolefins obtained by catalytic dimerization of at least monounsaturated olefin oligomers, the polyolefin having a number average molecular weight $\overline{M}_N$ of from 400 to 1500 dalton and a dispersity $\overline{M}_W/\overline{M}_N < 1.2$ and being at least monoethylenically unsaturated. Polyolefins which have a number average molecular weight $\overline{M}_N$ of from 400 to 800 dalton are preferred according to the invention. Such polyolefins are obtained by dimerization of olefin oligomers having number average molecular weights $\overline{M}_N$ of from 200 to 400 daltons.

In order to achieve a dispersity $\overline{M}_W/\overline{M}_N < 1.2$ in the case of the novel polyolefins, it is necessary for the short-chain oligomers to have a dispersity $\overline{M}_W/\overline{M}_N < 1.4$, preferably $\overline{M}_W/\overline{M}_N < 1.2$. If shorter-chain olefin oligomers having a dispersity $\overline{M}_W/\overline{M}_N < 1.2$ are used, polyolefins having an $\overline{M}_W/\overline{M}_N < 1.1$ are obtainable and are preferred according to the invention. For better control of the dimerization reaction, those short-chain oligomers are preferred in which at least 50% of the double bonds are terminal double bonds, ie. vinyl or vinylidene double bonds. Oligomers having at least 60% of vinylidene double bonds or at least 80% of vinyl double bonds are particularly preferred. The olefin oligomers preferably have only one double bond.

Short-chain oligomers are obtained, as a rule, in the form of volatile components in the homo or copolymerization of olefins, preferably $C_2$–$C_{10}$-olefins, in particular $C_2$–$C_6$-olefins. They are as a rule obtained by distillation from the polymerization products. Oligomers having the desired high content of terminal vinyl or vinylidene units are obtained, for example, from the polymers prepared by cationic polymerization, preferably using $BF_3$-containing catalysts (cf. DE-2702604, U.S. Pat. No. 5,068,490, U.S. Pat. No. 5,286,823 or WO 85/01942), or from the polymers prepared by metallocene-catalyzed polymerization. Examples of such polymerization processes are to be found, for example, in German Laid-Open application DOS 4,205,932 (vinylidene-containing polymers) or in EP-A 268 214 (vinyl-terminated polymers). The disclosure of the publications stated for the polymerization is hereby incorporated by reference.

The catalysts suitable for the dimerization are as a rule Lewis acid compounds, such as boron halides, eg. $BCl_3$ or $BF_3$, aluminum halides, such as $AlCl_3$ or alkylaluminum halides, for example alkylaluminum dichlorides, such as ethylaluminum dichloride. Hydrogen fluoride is also suitable as an acidic catalyst. The stated catalysts may be used alone or in combination with one another or in combination with complexing agents, such as hydrogen fluoride, acidic ion exchangers, silica gel, carboxylic acids and, if required, also inorganic acids. Preferably, boron trifluoride is used alone or in combination with an oxygen-containing compound as an acidic catalyst.

Examples of suitable oxygen-containing compounds are water, $C_1$–$C_{10}$-alcohols, $C_2$–$C_{10}$-diols, $C_1$–$C_{20}$-carboxylic acids, $C_4$–$C_{12}$-carboxylic anhydrides and $C_2$–$C_{20}$-dialkyl ethers. According to the invention, complexing agents from the class consisting of the $C_1$–$C_{20}$-alcohols or water are preferred according to the invention, in particular $C_1$–$C_4$-alcohols, very particularly preferably monohydric, secondary $C_3$–$C_{20}$-alcohols, as described in EP-A 628 575. Very particularly preferably, boron-trifluoride is used together with isopropanol and/or 2-butanol. The molar ratio of $BF_3$ to oxygen-containing compound does of course depend on the complex bond strength of the oxygen-containing compound and can be determined in a simple manner by a person skilled in the art. Where alcohols are used, it is from 1:2 to 2:1, preferably from 1:2 to 1:1 and very particular preferably from 1:1.7 to 1:1.1. Catalysts in which the complexes are rendered heterogeneous by adsorption onto solids, such as silica gel or molecular sieves, are preferred.

The dimerization can be carried out in the usual manner by batchwise procedure or by a continuous process. If the batchwise procedure is used, as a rule the catalyst is added to the oligomer, which may be diluted with an inert solvent. Particularly suitable solvents are hydrocarbons, preferably those which can be readily removed by distillation, for example butane, pentane, cyclopentane, hexane or isooctane. If complex catalysts are used, they may be added in the form of their complex or in free form to the complexing agent initially taken in the reaction medium.

The reaction temperature does of course depend on the respective catalyst or catalyst system. However, it is as a rule from −100° C. to +40° C., preferably from −100° C. to 0° C. If $BF_3$-containing catalyst systems are used, the reaction is carried out at below 0° C., preferably below −20° C. and particularly preferably below −25° C. Depending on the catalyst used in each case, the duration of the reaction is preferably from 30 min to 5 hours.

The dimerization is preferably carried out under isothermal conditions. Since it is exothermic, the heat of dimerization must then be removed. This is done, for example, with the aid of a cooling apparatus which may be operated with liquid ammonia as coolant.

Working up after the reaction is advantageously carried out by deactivating the dimerization catalyst, for example by means of water, alcohols, acetonitrile, ammonia or aqueous solutions of mineral bases, such as alkali metal and alkaline earth metal hydroxide solutions, solutions of carbonates of these metals and the like. As a rule, washing with water is then carried out. After removal of the water, any volatile components are also distilled off. Heterogeneous catalysts can be filtered off and reused. Any catalyst residues are removed by washing (see above).

The dimerization products obtained have number average molecular weights of from 400 to 1500 dalton in combination with a dispersity of from 1.0 to 1.2. Where oligomers having number average molecular weights $\overline{M}_N$ of from 200 to 400 dalton and a dispersity $\overline{M}_W/\overline{M}_N$ of <1.2 are used, oligomers having molecular weights of up to 800 dalton in combination with a dispersity of $\overline{M}_W/\overline{M}_N$<1.1 are obtainable. Such oligomers are particular suitable for the preparation of fuel additives.

The present invention furthermore relates to functionalized polyolefins obtainable by functionalizing the novel polyolefins, wherein the functionalized polyolefin is of the general formula I:

$$R_i\text{—}X \qquad (I)$$

where

R is the polyolefin radical, i is an integer from 1 to 4 and, when i is 1,

X is a functional group of the general formula (II)

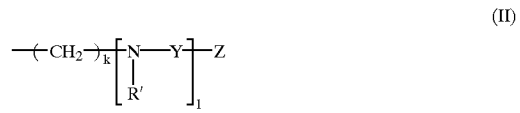

(II)

where k and l, independently of one another, are each 0 or 1,

R' is hydrogen, alkyl, hydroxyalkyl, aminoalkyl, cycloalkyl, aryl, aralkyl or —Y—Z, —Y— is a group

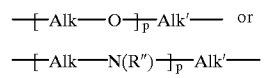

where

Alk and Alk' are identical or different and are each $C_2$–$C_4$-alkylene, p is an integer from 0 to 10 and R" is hydrogen, alkyl or aryl, and Z is selected from among

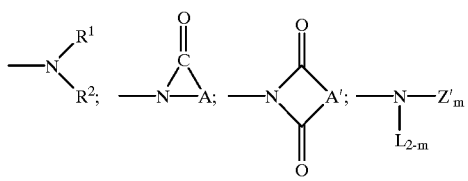

where

R$^1$ and R$^2$, independently of one another, are each hydrogen, alkyl, cycloalkyl, hydroxyalkyl, aryl or aralkyl and, if 1 is 0, may also be R and —CH$_2$—R, where R has the abovementioned meanings, or R$^1$ and R$^2$, together with the nitrogen atom to which they are bonded, form an unsubstituted or substituted heterocyclic structure which may contain a further heteroatom selected from oxygen and nitrogen, A is C$_3$–C$_5$-alkylene which is unsubstituted or mono- or polysubstituted by alkyl, cycloalkyl, aryl, hetaryl, aralkyl, or hetaralkyl, A' is C$_2$–C$_4$-alkylene, or C$_2$–C$_4$-alkenylene, both of which are unsubstituted or mono- or polysubstituted by alkyl, cycloalkyl, aryl, hetaryl, aralkyl or hetaralkyl, or is o-arylene, m is 1 or 2, L is hydrogen, alkyl, aryl, aralkyl, hetaryl or hetaralkyl and Z' is selected from among

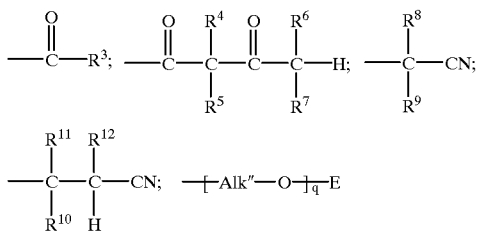

where

R$^3$–R$^{12}$, independently of one another, are each hydrogen, alkyl, aryl, hetaryl, aralkyl or hetaralkyl, q is from 1 to 50 and Alk" is C$_2$–C$_4$-alkylene which is unsubstituted or hydroxyl-substituted and E is hydrogen or one ester equivalent of an aliphatic, aromatic or araliphatic mono-, di-, tri- or tetracarboxylic acid;

or X is a functional group of the general formula (III)

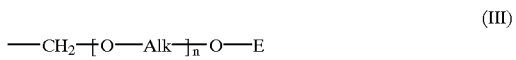

(III)

where n is an integer from 0 to 50,

Alk is a C$_2$–C$_4$-alkylene unit and

E has one of the abovementioned meanings:
or x is a functional group of the formula (IIIb)

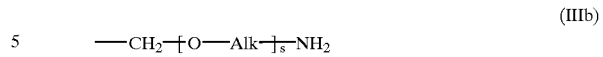

(IIIb)

where Alk has one of the meanings mentioned above and s is an integer from 1 to 50;
or X is a functional group of the general formula (IV)

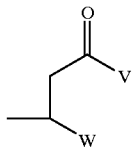

(IV)

wherein

V is alkyl, aryl, aralkyl, —O—R$^{13}$ or —NR$^{14}$R$^{15}$ and R$^{13}$ to R$^{15}$, independently of one another, may each be hydrogen, alkyl, which may furthermore be interrupted by one or more non-adjacent oxygen atoms and/or may also have NH$_2$— or OH-groups, or cycloalkyl, aryl, aralkyl, hetaryl or hetaralkyl, W may be hydrogen, alkyl, cycloalkyl, aryl, aralkyl, hetaryl or hetaralkyl, alkylcarbonyl, alkyloxycarbonyl, or alkylaminocarbonyl, or V and W, together with the carbonyl function on V, form a group

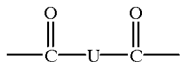

where

U is oxygen or NR$^{16}$, where R$^{16}$ may have the meanings stated for R$^{13}$–R$^{15}$;
or, if i is from 2 to 4, X is a group of the general formula (V)

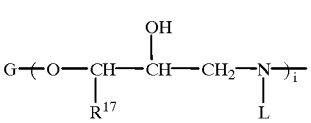

(V)

where G is derived from a di-, tri- or tetravalent aliphatic radical, L has the abovementioned meanings and R$^{17}$ is hydrogen or C$_1$–C$_4$-alkyl.

Below, alkyl is understood as meaning linear or branched, saturated hydrocarbon chains of, preferably, 1 to 10 carbon atoms. For example, the following radicals may be mentioned: lower alkyl, ie. C$_1$–C$_6$-alkyl, such as methyl, ethyl, n-propyl, isopropyl, n-butyl, sec-butyl, isobutyl, tert-butyl, n-pentyl, sec-pentyl, isopentyl, n-hexyl, 1-, 2- or 3-methylpentyl; longer-chain alkyl radicals, such as heptyl, octyl, 2-ethylhexyl, nonyl and decyl.

Alkoxy is understood as meaning alkyl which is bonded via an oxygen atom. Accordingly, alkylamino and alkylcarbonyl are alkyl groups which are bonded via a nitrogen atom or a carbonyl function.

Aminoalkyl or hydroxyalkyl is alkyl as defined above which has an amino group or hydroxyl group, preferably on a terminal carbon atom.

Cycloalkyl preferably means C$_3$–C$_8$-cycloalkyl, in particular cyclopentyl or cyclohexyl, each of which is unsubstituted or substituted by $C_1$–$C_4$-alkyl or $C_1$–$C_4$-alkoxy. Alkylene preferably means a 1,2-, 1,3- or 1,4-alkylene unit, eg. 1,2-ethylene, 1,2-propylene, 1,2-butylene, 1,3-propylene, 1,4-propylene, 1-methylpropylene, 1,2-pentylene or 1,2-hexylene.

Aryl is preferably to be understood as meaning phenyl or naphthyl which may carry 1, 2, 3 or 4 substituents.

The hetaryl groups are preferably 5- or 6-membered aromatic ring systems which contain from 1 to 4 heteroatoms selected from O, S and N, for example furyl, pyrrolyl, imidazolyl, pyrazolyl, oxazolyl, isoxazolyl, oxydiazolyl, tetraazolyl, pyridyl, pyrimidyl, pyrazinyl, pyradizinyl, triazinyl, tetrazinyl and the like.

Aralkyl is to be understood as aryl groups which are bonded by a $C_1$–$C_6$-alkylene unit, eg. benzyl or phenethyl. The same applies to hetaralkyl. Suitable substituents are $C_1$–$C_6$-alkyl, $C_1$–$C_6$-alkyloxy, $C_2$–$C_6$-alkenyl, $C_1$–$C_6$-alkanoyl and alkylcarbonyl, such as acetyl and propionyl, and hydroxyl, which, if required, may also be ethoxylated, hydroxyalkyl, aminoalkyl, nitro, carboxyl and amino.

Functionalized polyolefins of the general formula (I) where X is a general radical of the formula (II) with k=1 are obtainable by hydroformylation of the monoethylenically unsaturated homo and copolymers and subsequent reductive amination of the aldehyde function obtained by the hydroformulation, ie. by reaction with ammonia or a primary or secondary amine in the presence of hydrogen and a hydrogenation catalyst. This gives compounds of the general formula (VI)

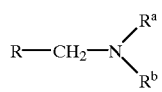

(VI)

where $R^a$ and $R^b$, independently of one another, are each hydrogen, alkyl, which may be interrupted by one or more nonadjacent amino groups or oxygen atoms, or cycloalkyl, which may also have heteroatoms, such as N or O, in the ring, or aryl, aralkyl, hetaryl, hetaralkyl or $CH_2$—R, where R is derived from said polyolefin.

Suitable amines in addition to ammonia comprise mono- and di-$C_1$–$C_{10}$-alkylamines, such as mono- and dimethylamine, mono- and diethylamine, mono- and di-n-propylamine, mono- and di-n-butylamine, mono- and di-sec-butylamine, mono- and di-n-pentylamine, mono- and di-2-pentylamine, mono- and di-n-hexylamine, etc. Other suitable amines are diamines, such as ethylene diamine, propylene-1,2-diamine, propylene-1,3-diamine, butylenediamines and the mono-, di- and trialkyl derivatives of these amines. Polyalkylenepolyamines whose alkylene radicals are of 2 to 6 carbon atoms, such as diethylenetriamine, triethylenetetramine and tetraethylenepentamine, may also be used. Mono- or dialkylamines in which the alkyl radical may be interrupted by one or more nonadjacent oxygen atoms and which may also have hydroxyl groups are also suitable. These include, for example, 4,7-dioxadecane-1,10-diamine, ethanolamine, 3-aminopropanol, 2-(2-aminoethoxy)ethanol and N-(2-aminoethyl)ethanolamine. Cyclic amines, such as pyrrolidine, piperidine, piperazine or morpholine, and substituted derivatives thereof, such as N-amino-$C_1$–$C_6$-alkylpiperazines, may furthermore be used. Moreover, aryl, aralkyl-, hetaryl- or hetaralkylamines may be used. Such preparation processes are known to a person skilled in the art and are described, for example, in EP-A 244 616, DE-A 3611230 or WO 94/24231.

If the compounds of the general formula (VI) also contain primary or secondary amino functions, they may be derivatized by the conventional methods of organic chemistry. If they are, for example, compounds having primary amino functions (compound IIa)), they can be reacted with lactones of the general formula (IX), compounds of the general formula (IIb) being obtained.

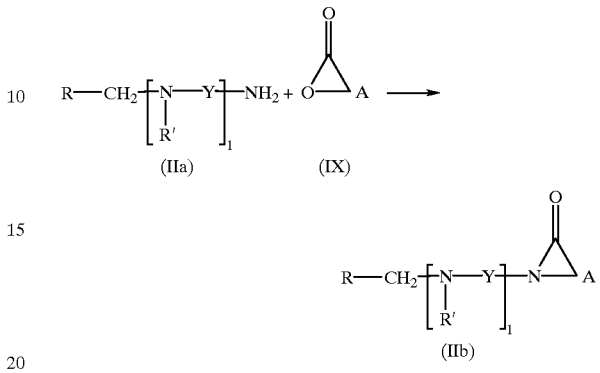

In the formulae (IX) and (IIb), A is $C_3$–$C_5$-alkylene which may have from 1 to 5 substituents. R, R', Y and 1 have the abovementioned meanings.

Such lactones are known and can be prepared by Bayer-Villiger-Oxidation, for example starting from cyclic ketones. γ-, δ- or ε-lactones, such as γ-butyrolactone, γ- or δ-valerolactone or ε-caprolactone, and the mono- or polysubstituted analogs thereof are preferably used. The reaction is preferably carried out by a procedure in which the amino-functionalized polyolefin of the formula (IIa) is reacted with the lactone (IX) in the absence of a solvent or in a suitable solvent, for example tetrahydrofuran, or in another inert solvent, in a conventional manner at elevated temperatures, for example from 200 to 320° C., and superatmospheric pressure, eg. from 50 to 300 bar, and the product formed is obtained with removal of the water formed in the reaction and any unconverted lactone. If mixtures of lactones of the general formula (IX) are used, the novel compounds of the general formula (IIb) may simultaneously contain different cyclic terminal groups.

Preparation of the cyclic imides of the general formula (IIc) can be carried out in a similar manner. Such reactions are known in principle to a person skilled in the art and are described, for example, in J. March (Advanced Organic Chemistry 3rd. edition, J. Wiley, New York, page 371 et seq. and the literature cited there).

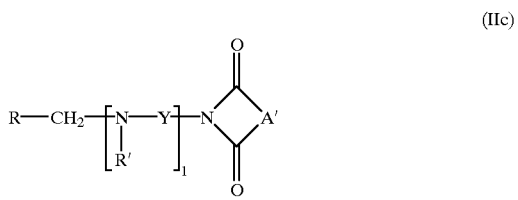

(IIc)

Here too, primary amines of the general formula (IIa) (see above) are used as starting materials. These are reacted with suitable cyclic dicarboxylic anhydrides or with the dicarboxylic acids themselves. Suitable dicarboxylic acids or dicarboxylic anhydrides are succinic anhydride, maleic anhydride and phthalic anhydride and their substituted analogs.

The preparation of compounds of the general formula (IId) where R, R', Y, l, L, m and Z', have the abovementioned meanings is carried out as a rule by functionalizing the primary or secondary amino functions in compounds of the general formula (X). Compounds (X) which, where m is 2, correspond to the primary amines (IIa) can, like these, also be prepared by hydroformylation and subsequent reductive amination (see above).

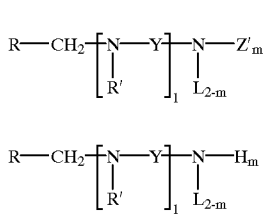

(IId)

(X)

Compounds of the general formula (IId), where Z' is

and $R^3$ has the abovementioned meanings can be prepared by the conventional methods of acylation of primary or secondary aminofunctions (see J. March, Advanced Organic Chemistry, 3rd edition, J. Wiley 1985, page 370 et seq. and the literature cited there). Compounds of the general formula (IId), where Z' is formyl ($R^3$=H), can be prepared by reacting primary or secondary amines of the general formula (X) with carbon monoxide or with an alkaline formate in the presence of alkali metal alcoholates. Sodium alcoholates or potassium alcoholates, in particular alkali metal methylates, are preferably used. Sodium methylate is very particularly preferred.

The reaction of the amine of the formula (X) with carbon monoxide is preferably carried out after establishing the following parameters:

Carbon monoxide is used in excess in the reaction. The ratio of carbon monoxide to the amine is established by means of the partial pressure of the carbon monoxide.

The molar ratio of the amine (X) to the catalytically active alkali metal alcoholate is as a rule from about 2000:1 to about 1000:1, preferably from 12000:1 to about 5000:1.

The reaction is carried out in the presence of an alcohol. These alcohols are as a rule primary aliphatic $C_1$–$C_{10}$-alcohols, such as methanol, ethanol, isopropanol, n-butanol, n-pentanol and the like, preferably methanol or ethanol, in particular methanol.

The reaction can be carried out in a solvent differing from the above alcohols. For example, the following may be mentioned as solvents: hydrocarbons, such as hexane, cyclohexane, $C_5$–$C_{20}$-hydrocarbon mixtures, eg. $C_{10}$–$C_{13}$-hydrocarbon mixtures (for example Mihagol), and the like. The amount of solvent is in general from about 10 to 90% by weight, based on the total batch.

The reaction is carried out at from about 10 to about 200° C., preferably from about 20 to about 100° C. The reaction pressure is from about 10 to about 200, preferably from about 20 to about 100, bar. The reaction times are in general from about 0.1 to 5 hours.

In order to carry out the reactions, the reactants are mixed and are then brought to the reaction temperature under CO pressure. Working up can be carried out in a manner known per se by separating off the catalyst, distilling off the solvent and, if required, purifying the reaction product by chromatography or distillation.

Where the amine of the formula (X) is reacted with a formate, the following parameters are preferably applicable.

The formates used are alkyl formates. $C_1$–$C_6$-alkyl esters, eg. methyl formate and ethyl formate, are preferably used; methyl formate is particularly preferred.

The molar ratio of alkyl formate, eg. methyl formate, to the amine (X) is as a rule from about 10:1 to about 1:1. The ester is preferably used in excess, for example in a ratio of from about 3:1 to about 1.3:1.

The reaction can be carried out in a solvent, for example in one of the abovementioned solvents, such as hexane, cyclohexane, $C_5$–$C_{20}$-hydrocarbon mixtures, eg. $C_{10}$–$C_{13}$-hydrocarbon mixtures (for example Mihagol), and the like. The amount of solvent is in general from about 10 to 90% by weight, based on the total batch.

The reaction is carried out at from about 10 to about 200° C., preferably from about 20 to about 100° C. The reaction pressure is the autogenous pressure of the reaction mixture at the chosen temperature. If a pressure higher than the autogenous pressure of the mixture is desired, an inert gas, eg. nitrogen, may be additionally be forced in. The reaction times are in general from about 0.1 to about 5 hours.

In order to carry out the reaction, the reactants are mixed and are then brought to the reaction temperature. Working up can be carried out in a manner known per se by distilling off the low boilers and, if required, by purifying the reaction product by chromatography or distillation.

If, in the formula (IId) Z' is a group

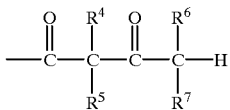

where $R^4$–$R^7$ have the abovementioned meanings, the novel functionalized polyolefins are obtainable by reacting the primary or secondary amines of the general formula (X) with diketenes of the general formula (XI).

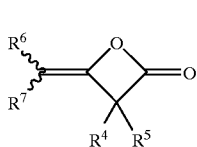

(XI)

The preparation is carried out in the manner known per se, by reacting the amine (X) with the diketene (XI) in the absence of a solvent or in an inert solvent, with cooling, at room temperature or at elevated temperatures, depending on the reactivity of the reactants. Examples of suitable solvents include sulfur- and chlorine-free solvents, such as high-boiling hydrocarbons, eg. n-hexane, n-octane, n-decane or isododecane, or dipolar aprotic solvents, such as anhydrous tetrahydrofuran. Compound (X) is preferably dissolved in a suitable solvent and the diketene (XI), if necessary dissolved in the same solvent, is added dropwise with stirring. The reaction products obtained can be used without further purification, if necessary after distilling off the solvent or removing superfluous reagents.

The novel functionalized polyolefins also include compounds of the general formula (IId), where Z' is a group

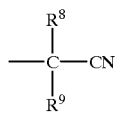

and $R^8$ and $R^9$ have the abovementioned meanings. Such compounds are obtainable by functionalizing the amino group in (X) by cyanomethylation.

The cyanomethylation is carried out by reacting a polyalkylamine of the general formula (X) with hydrocyanic acid or with a salt thereof and at least one ketone $R^8$—C(O)—$R^9$, where $R^8$ and $R^9$ have the abovementioned meanings. The reaction is carried out as a rule in the presence of a phase-transfer catalyst.

Suitable phase-transfer catalysts include quaternary ammonium and phosphonium salts, but quaternary ammonium salts are preferred. Examples of suitable phase-transfer catalysts are benzyltriethylammonium chloride, tetrabutylammonium bromide, methyltricaprylammonium chloride and methyltributylammonium chloride and the corresponding halogen-free forms of these compounds. The reaction is carried out as a rule at from room temperature to 100° C., preferably from 40 to 80° C.

The reaction of the amine (X) is carried out in water or polar organic solvents, such as alcohols or cyclic ethers, eg. tetrahydrofuran, or mixtures thereof. The amine (X) is preferably initially taken together with the phase-transfer catalyst in a polar organic solvent, if necessary together with water, and the hydrocyanic acid or an aqueous solution of suitable alkali metal or alkaline earth metal cyanide and the ketone or the aldehyde, if necessary as the solution in an organic solvent or water or a mixture thereof, are added dropwise. After removal of the phase-transfer catalyst by washing with water and removal of the solvent, the cyanoalkylated product remains behind in a form which can be used directly.

Additives of the general formula (IId), where Z' is

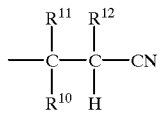

and $R^{10}$ to $R^{12}$ has the abovementioned meanings, can be prepared by the processes described in EP-A 568 873, which is hereby fully incorporated by reference, by the cyanoethylation method, ie. reaction of the primary or secondary amine (X) with an α, β-unsaturated nitrile.

Additives of the general formula (IId), where Z' is a group of the general formula

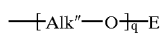

and Alk", q and E have the abovementioned meanings, are obtainable by alkoxylation of amines of the general formula X with oxiranes, preferably with ethylene oxide, 1,2-propylene oxide or 1,2-butylene oxide. The alcohols of the general formula (VIIa)

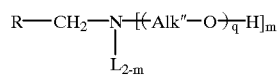

which are obtainable by this method can then be esterified with suitable carboxylic acids or carboxylic acid derivatives to give the esters of the general formula (VII),

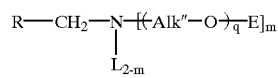

where R, Alk", L, m and q have the abovementioned meanings and E is one ester equivalent of an aliphatic, aromatic or araliphatic mono-, di-, tri- or tetracarboxylic acid. Suitable esterification components are mono- and dicarboxylic acids and their anhydrides or acid chlorides, and furthermore tri- and tetracarboxylic acids. Suitable carboxylic acids preferably include acetic acid, propionic acid, ethylhexanoic acid, benzoic acid, 2-phenylacetic acid, isononanoic acid, succinic acid, adipic acid, maleic acid, phthalic acid, terephthalic acid, isophthalic acid, citric acid, trimellitic acid, trimesic acid, pyromelitic acid and butanetetracarboxylic acid. The di- or polycarboxylic acids may be partially or completely esterified with the alcohols (VIIa). However, they are preferably only partially esterified with the alcohols (VIIa). The free carboxyl functions can be reacted with ammonia or primary or secondary amines. The ammonium salts, amides, imides or aminocarboxylic acids obtainable thereby likewise have excellent dispersing properties and are therefore suitable as fuel and lubricant additives. Compounds of the general formula (VII), where Alk" is 1,2-ethylene, 1,2- or 1,3-propylene or 1,2- or 3,4-butylene, are preferred, among which the alcohols (VIIa) are particularly preferred. L is preferably hydrogen or $C_1$–$C_6$-alkyl and m is preferably 1. Particularly preferred compounds are those of the general formula (VII) or (VIIa), where q is chosen so their number average molecular weight $M_N$ is from 1000 to 3000 dalton. Such compounds can be prepared by the conventional methods of alkoxylation of polyalkenylamines, as described, for example, in EP-A 244 616.

Amino-functionalized polyolefins of the general formula (XII),

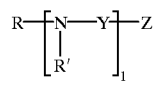

where R, R', Y, Z and l have the abovementioned meanings, which differ by a $CH_2$-group from the amines of the general formula (VI) which are obtained by the method of hydroformylation/reductive amination likewise form the subject of the present invention. Their preparation can be carried out by two different methods.

For example, it is known that the double bond of ethylenically unsaturated polyolefins can be epoxidized. The oxirane-functionalized polyolefins thus obtainable can be subjected to ring cleavage with ammonia or primary or secondary amines to give aminoalcohols (cf. for example WO 92/12221, WO 92/14806, EP-A 476 485 and EP 539 821). The aminoalcohols obtainable by this method can be catalytically dehydrated. The enamine formed is then hydrogenated to give the amine. The conversion of the epoxide into the amine can be carried out in separate stages. However, it is also possible to carry out the conversion of the epoxide into the amine in one stage by reacting the epoxide with ammonia or a primary or secondary amine in the presence of hydrogen and a catalyst which has dehydration and at the same time hydrogenation properties.

Catalysts which can be used according to the invention and have dehydration and hydrogenation properties are preferably chosen from among zeolites or porous oxides of Al, Si, Ti, Zr, $\overline{M}_W$, Mg and/or Zn, acidic ion exchangers and heteropolyacids, each of which have at least one hydrogenating metal. The hydrogenating metals used are preferably Ni, Co, Cu, Fe, Pd, Pt, Ru, Rh or combinations thereof.

Solid-state zeolite catalysts suitable according to the invention are described, for example, in EP-A 539 821, which is hereby fully incorporated by reference. To optimize selectivity, conversion and catalyst lives, the zeolites used according to the invention can be doped in a suitable manner with further elements (cf. EP 539 821). The zeolites may also be doped with the abovementioned hydrogenating metals. The hydrogenating metals account for from 1 to 10% by weight, calculated as oxides, of the total weight of the catalytically active material.

Further suitable catalysts having dehydration and hydrogenation properties are preferably acidic oxides of the elements Al, Si, Zr, Nb, Mg or Zn or mixtures thereof, which are doped with at least one of the abovementioned hydrogenating metals. The oxide (calculated as $Al_2O_3$, $SiO_2$, $ZrO_2$, $Nb_2O_5$, MgO or ZnO) is present in the catalyst material in an amount of from about 10 to 99, preferably from about 40 to 70, % by weight. The hydrogenating metal (calculated as NiO, CoO, CuO, $Fe_2O_3$, PdO, PtO, $RuO_2$ or $Rh_2O_3$) is present in an amount of from about 1 to 90, preferably from about 30 to 60, % by weight, based on the total weight of the catalytically active material. Moreover, the oxides used according to the invention may contain small amounts, ie. from about 0.1 to 5% by weight (calculated for the oxides), of further elements, eg. Mo or Na, in order to improve catalyst properties, such as selectivity and catalyst life. Such oxides and their preparation are described, for example, in EP-A 696 572, which is hereby fully incorporated by reference.

The conversion of the epoxides to the amines may be carried out both continuously and batchwise. The temperatures in both process variants are from about 80 to 250° C., preferably from about 150 to 210° C. The reaction is carried out at hydrogen pressures up to about 600, preferably from about 80 to 300, bar. The amine is used in a molar ratio of from about 1:1 to about 40:1, preferably in an excess of from about 5:1 to about 20:1, based on the epoxide. The reaction can be carried out in the absence of a solvent or in the presence of a solvent (for example of a hydrocarbon, such as hexane, or tetrahydrofuran).

Examples of suitable amines in addition to ammonia are ethylene-1,2-diamine, propylene-1,2-diamine, propylene-1,3-diamine, butylenediamines, and the monoalkyl-, dialkyl- and trialkyl derivatives of these amines, eg. N,N-dimethylpropylene-1,3-diamine. Polyalkylenepolyamines whose alkylene radicals are of not more than 6 carbon atoms, for example polyethylenepolyamines, such as diethylenetriamine, triethylenetetramine and tetraethylenepentamine, and polypropylenepolyamines, may also be used. Mono- or dialkylamines in which the alkyl radicals are interrupted by one or more non-adjacent oxygen atoms and which may also have hydroxyl groups or further amino groups, such as 4,7-dioxadecane-1,10-diamine, ethanolamine, 3-aminopropanol, 2-(2-aminoethoxy)ethanol, N-(2-aminoethyl)ethanolamine, are also suitable. Further examples are N-amino-$C_1$–$C_6$-alkylpiperazines. Ammonia is preferably used.

The amines of the general formula (XII) obtainable by this method, in particular the primary amines (XIIa) (here, Z in the formula (XII) is $NH_2$ and l is 0), which are obtainable by reacting oxiranes with ammonia, can be further functionalized by the methods described above.

R—$NH_2$ (XIIa)

The second route to amino-functionalized polyalkenes of the formula (XII) involves subjecting the monoethylenically unsaturated polyalkenes to a Ritter reaction. This is to be understood as meaning the reaction of olefins with HCN or nitriles under acidic catalysis. The reaction takes place via the formamide or acyl derivatives, which can then be hydrolyzed to the primary amines of the general formula (XIIa), where R has the abovementioned meanings. The Ritter reaction is described in Houben-Weyl ES, pages 103–1041 (1985) or Houben-weyl, XI/1 page 994 et seq. (1987). The preparation of polyalkyleneamines by the Ritter reaction is described, for example, in German Laid-Open Application DE-OS 2,061,057 or EP-A 567 810, which are fully incorporated here by reference.

A further class of lubricant and fuel additives comprises compounds of the general formula (XIII)

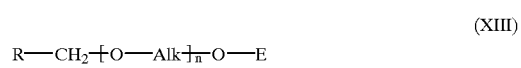

R—$CH_2$$+$O—Alk$\overline{)_n}$–O—E (XIII)

corresponding to the compounds of the general formula I, where X is:

—$CH_2$$+$O—Alk$\overline{)_n}$–O—E

Here, Alk, E and n have the abovementioned meanings.

One embodiment of the present invention are said compounds, where n obtains values from 0 to 10. Another embodiment relates to said compounds, where the average value of n ranges from 11 to 50, preferably from 15 to 35. In the last mentioned embodiment E is preferably hydrogen.

They are prepared similarly to the preparation of the amino-functionalized derivatives of the general formula (VI), starting from the hydroformylation product of the novel polyolefins. This is then hydrogenated under an excess of hydrogen to give the corresponding alcohol of the general formula (VIIIa). Such processes are described, for example, in EP-A 277 345, which is hereby fully incorporated by reference. The alcohols obtainable in this manner and of the general formula (VIIIa),

R—$CH_2$—OH (VIIIa)

where R has the abovementioned meanings, can be alkoxylated by known methods of organic chemistry to give compounds of the general formula (XIIIa),

R—$CH_2$$+$O—Alk$\overline{)_n}$–OH (XIIIa)

where R, Alk and n have the abovementioned meanings, and/or esterified to give compounds of the general formula (XIV) or (VIII).

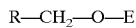　(VIII)

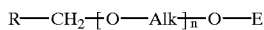　(XIV)

The addition reaction of alkylene oxides with alcohols in the presence of basic catalysts is sufficiently well known. In particular, ethylene oxide, propylene oxide and butylene oxide and mixtures thereof are of industrial importance, but addition reactions of compounds such as cyclohexene oxide are also possible. Said alkoxylation reactions can also be performed on the crude products obtained from a hydroformylation reaction because the alcohols (VIIIa) are formed in noticeable amounts during the hydroformylation. Moreover, the aldehydes R—CHO will disproportionate in sense of a cannizarro reaction into the alcohol (VIIIa) and a carboxylate salt R—CO$_2$M, where M is the cation of the conventionally used alkoxylation catalyst. Other suitable fuel or lubricant additives are the esters of the alcohols (VIIIa) and their alkoxylation products (XIIIa). Suitable esterification components are mono- and dicarboxylic acids and their anhydrides or acid chlorides, and furthermore tri- and tetracarboxylic acids. Suitable mono- or polycarboxylic acids include acetic acid, propionic acid, ethylhexanoic acid, isononanoic acid, succinic acid, adipic acid, maleic acid, phthalic acid, terephthalic acid, citric acid, trimelitic acid, trimesic acid, pyromelitic acid and butanetetracarboxylic acid.

The di- or polycarboxylic acids may be partially or completely esterified, but they are preferably only partially esterified with the alcohols of the general formula (VIIIa) or (XIIIa). Free carboxylic acid functions can be reacted with ammonia or primary or secondary amines. The ammonium salts, amides, imides or amino acids obtainable thereby likewise have excellent dispersing properties and are therefore also suitable as fuel and lubricant additives.

Related to said class of compounds are the amines of the formula (XIVb)

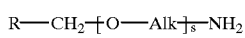　(XIVb)

where R has one of the abovementioned meanings, s is an integer from 1 to 50, preferably from 10 to 40, and Alk has one of the abovementioned meanings and is preferably 1,2-ethylene or 1,2-propylene. Said amines (XIVb) are obtainable e.g. from alcohols (VIIIa) or aldehydes R—CHO by an alkoxylation reaction in the presence of basic catalysts such as sodium hydroxide or potassium hydroxide or earth alkaline metal oxides such as barium oxide via the alkoxylation reaction products of the formula R—CH$_2$—[O—Alk]$_s$—OH, where R, Alk and s have the abovementioned meanings, reacting said compounds with ammonia/hydrogen in the presence of hydrogenation catalysts such as Raney nickel or Raney cobalt under elevated pressure, e.g. 100 to 300 bar and elevated temperature, e.g. 100 to 300° C.

A third class of novel, functionalized polyolefins comprises compounds of the general formula (XIV), where R, V and W have the abovementioned meanings. Succinic acid derivatives of the general formula (XV), where U is oxygen or NR$^{16}$ and R$^{16}$ has the abovementioned meanings, are preferred. U is particularly preferably NR$^{16}$.

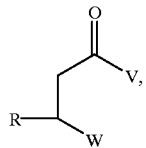　(XIV)

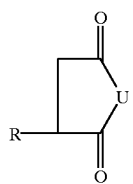　(XV)

Such compounds are obtained by subjecting the monoethylenically unsaturated polyalkenes to an ene reaction with α, β-unsaturated carbonyl compounds of the general formula (XVI)

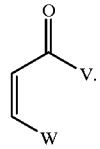　(XVI)

The compounds of the general formula (XVI) are preferably maleic anhydride, which is subsequently functionalized with a primary amine of the general formula H$_2$NR$^{16}$ or an alcohol. Such processes are known to a person skilled in the art and are described, for example, in DE-A 2702604.

A fourth class of novel functionalized polyolefins comprises compounds of the general formula I, where i is from 2 to 4 and X is a group of the general formula (V)

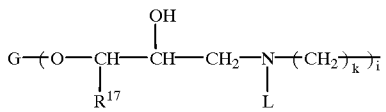　(V)

where G is derived from a di-, tri- or tetravalent organic radical, L and k have the abovementioned meanings and R$^{17}$ is hydrogen, alkyl, aryl, aralkyl or hetaryl, but preferably hydrogen. L is likewise preferably hydrogen.

Such compounds can be prepared by reacting the novel amines of the general formula (X) (see above) or (XVII) (the formula (XVII) corresponds to the formula (XII) with Z'=NH$_m$L$_{2-m}$, where L and m have the abovementioned meanings) with glycidyl ethers of the general formula (XVIII)

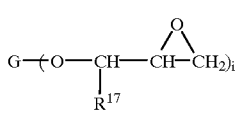　(XVIII)

where R$^{17}$, G and i have the abovementioned meanings, by known processes. The glycidyl ethers (XVIII) are formally derived from divalent, trivalent, tetravalent or higher-valent aliphatic alcohols, such as glycol, 1,2- or 1,3-propanediol, 1,2-, 1,3- or 1,4-butanediol, diethylene glycol, triethylene glycol, glycerol, trimethylolpropane, mannite, erythritol, pentaerythritol, arabitol, adonitol, xylitol or sorbitol. In the glycidyl ethers (XVIII), from 2 to 4 of the OH groups of the stated polyhydroxy compounds are etherified with glycidyl groups. In the preferred compounds of the general formula (I), where X is a group of the general formula (V), the general formula (V) is derived from 1,2-, 1,3- or 1,4-butanediol, trimethylolpropane or pentaerythritol, in which all OH groups have been etherified with glycidyl groups. Also suitable are compounds of the general formula (I) where i is 1 and X is a radical

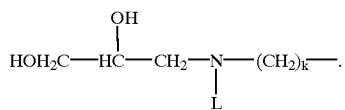

Such compounds are obtained by reacting glycidol with an amine (X) or (XVII).

As in the case of the novel, nonfunctionalized polyolefins, the novel functionalized polyolefins of the general formula (I) can also be used in the usual manner as fuel or lubricant additives. A typical fuel composition, for example a fuel for gasoline and diesel engines, contains the novel polyolefins and/or the compounds of the general formula (I) in amounts of from 20 to 5000, preferably from about 50 to 1000 mg/kg of fuel. The novel additives can, if required, also be introduced together with other additives. They serve in particular as detergents for keeping the fuel intake system clean. Such additive-containing fuels have high cleaning effects, ie. a low level of deposits on the intake valves.

The invention furthermore relates to lubricant compositions which contain at least one novel functionalized polyolefin of the general formula (I), according to the above definition, if required in combination with further conventional lubricant additives. Examples of conventional additives are corrosion inhibitors, antiwear additives, viscosity improvers, detergents, antioxidants, antifoams, lubricity improvers and pour point improvers. The novel compounds are usually present in the lubricant composition in amounts of from 0.5 to 15, preferably from about 1 to 10, % by weight, based on the total weight. Examples of lubricants prepared according to the invention include oils and greases for motor vehicles and industrially used drive units, in particular engine oils, gear oils and turbine oils.

The examples which follow illustrate the invention without however restricting it.

EXAMPLES

Analysis

The number average molecular weight $\overline{M}_N$ of the starting materials was determined by combined gas chromatography/mass spectrometry according to known methods. Alternatively, the molar masses of the reaction products were determined by means of gel permeation chromatography (GPC): the discrimination according to molar masses was carried out over 5 mixed B columns (l=300 mm, d=7.5 mm, loaded with PL-gel) from Polymer Laboratories, which were connected in series. The mobile phase used was tetrahydrofuran. The detection was carried out via the refractive index using an RI-Detector 410 from Waters. Commercial polyisobutene standards were used for the calibration. The chromatography was carried out at T=35° C. and a flow rate of 1.2 ml/min.

The dimers were characterized with regard to their molecular weight distribution by means of known gel permeation chromatography (GPC) methods and by means of known gas chromatography methods (evaluation of the peak integrals).

The calculation was based on the following formulae:

$$\overline{M}_N = \frac{\Sigma c_i}{\Sigma \frac{c_i}{M_i}} \quad \overline{M}_W = \frac{\Sigma c_i M_i}{\Sigma c_i}$$

Here, $M_i$ is the molecular weight of the individual polymer species i and $c_i$ is the parts by weight of the polymer species i in the polymer or oligomer mixture, obtainable from the chromatograms.

The proportion of vinylidene double bonds in the starting oligomers was determined by means of $^{13}$C-NMR-spectroscopy (100.7 MHz), on the basis of characteristic signals at 114.4 and 143.6±0.4 ppm (cf. U.S. Pat. No. 5,286,823).

Determination of functionalization yields and amine numbers

The functionalization yield of the hydroformylation was determined by preparative liquid chromatography. For this purpose, 20 g of a sample of the hydroformylation batch (see below) were freed from the solvent at 230° C./2 mbar, weighed, taken up in 20 ml of heptane and applied to a silica gel column (l=1 m, d=40 mm), whose free volume was filled with n-heptane. Elution was effected with 2 l of heptane in the course of 2 to 3 hours, and the eluate was freed from the solvent at 230° C./2 mbar and was reweighed. The functionalization yield F was calculated from the reweighing R and the sample weight S: F=100 (S−R)/S.

The amine numbers were determined as follows. First, the total amine number was determined by a potentiometric titration with trifluoromethanesulfonic acid in glacial acetic acid. Primary amine was derivatized by reaction with a 25% strength by weight solution of acetylacetone in pyridine, and the content of primary amine was determined by back titration with sodium methylate solution. To determine the tertiary amine, the primary and secondary amine was acetylated and remaining tertiary amine was then determined by potentiometric titration with trifluoromethanesulfonic acid in glacial acetic acid. The content of secondary amine was calculated by subtracting primary and secondary amine from the total amine number. The OH number, ester number, carbonyl number and acid number were determined by known methods.

The suitability of the novel functionalized polyolefins as fuel additives is tested with the aid of engine tests, which are carried out on test stands with a 1.2 l Opel Kadett engine according to CEC-F-04-A-87. The fuel used is European premium grade according to DIN 51607, together with reference oil L293.

Starting Materials

The oligobut-1-ene distillate used originated from the polymerization of but-1-ene by means of zirconocene catalysis:

Triisobutylaluminoxane was prepared by the method in EP-A 575 356. 3.5 g of a solution of isobutylaluminoxane in heptane (3% by weight, based on AL; 3.89 mmol of Al), 0.27 g of trimethylaluminum and 18 g of 1-butene were initially taken in succession in a reaction vessel under inert gas, and solid biscyclopentadienylzirconium(IV)chloride (0.32 g) was added. The mixture was heated for 22 hours at 50° C., after which 10% strength hydrochloric acid was introduced while cooling with ice. The organic phase was separated off and was subjected to fractional distillation to remove the solvent. According to GC-MS and GPC, the oligomer had a number average molecular weight $\overline{M}_N$ of 286 and a dispersity $\overline{M}_W/\overline{M}_N$ of 1.07 (34.2% by weight of tetramer, 26.5% by weight of pentamer, 17.1% by weight of hexamer, 11.1% by weight of heptamer, 6.2% by weight of octamer, 3.5% by weight of nonamer and 1.4% by weight of decamer).

The propene oligomerization distillate used was obtained similarly to the 1-butene oligomer. The number average molecular weight $M_N$ according to GC-MS and GPC was 290, and the dispersity $\overline{M}_W/\overline{M}_N$ was 1.02 (0.2% by weight of pentamer, 45% by weight of hexamer, 31% by weight of heptamer, 14.4% by weight of octamer, 6% by weight of nonamer, 2.7% by weight of decamer and 0.17% by weight of undecamer).

The isobutene oligomer used is the distillate from the preparation of isobutene from polyisobutene with $BF_3$-catalysis according to Example 2 of U.S. Pat. No. 5,286,823. According to GC-MS and GPC, the oligomer had a number average molecular weight $\overline{M}_N$ of 202 and a dispersity $\overline{M}_W/\overline{M}_N$ of 1.05 (47.3% by weight of trimer, 31.7% by weight of tetramer, 14.5% by weight of pentamer, 5.1% by weight of hexamer and 1.4% by weight of heptamer).

Preparation of the Dimers 500 g of oligobut-1-ene distillate were diluted with 300 g of n-hexane, and the water content was reduced to 1 ppm by treatment with a 3 Å molecular sieve. 3.7 g of 2-butanol were added to the solution in a 1 l double-jacket flask, and the mixture was cooled to −30° C. 3.4 g of boron trifluoride were passed into the solution in the course of 30 minutes at −30° C., and this temperature was maintained for a further 30 minutes. Thereafter, the mixture was warmed up to 20° C., 250 g of demineralized water were added and the solution was left for a further 15 minutes. The water was then separated off and the organic phase was washed with a total of 500 g of demineralized water and was distilled. At a bottom temperature of 230° C. and a pressure of 2 mbar, 395 g of the desired polyolefin remained in the distillation residue. The results are summarized in Table 1.

Example 2

The distillate of the propene oligomerization (see above) was reacted similarly to Example 1. 380 g of polyolefin remained in the distillation residue. The results are summarized in Table 1.

Example 3

Oligomeric isobutene (see above) was reacted similarly to Example 1. 310 g of polyisobutene remained in the distillation residue. The properties of the polyisobutene are summarized in Table 1.

TABLE 1

|  | Example 1 | | Example 2 | | Example 3 | |
| --- | --- | --- | --- | --- | --- | --- |
|  | Starting material | Product | Starting material | Product | Starting material | Product |
| $\overline{M}_N$ [dalton] | 286 | 565 | 290 | 560 | 202 | 7405 |
| $\overline{M}_W/\overline{M}_N$ | 1.07[2] | 1.07[2]/1.04[3] | 1.02[2] | 1.05[2]/1.02[3] | 1.05[2] | 1.08[2]/1.03[3] |
| Vinylidene[1] [%] | 99 | — | 9.9 | — | 65 | — |
| Bromine number | — | 28 | — | 29 | — | 40 |

TABLE 1-continued

|  | Example 1 | | Example 2 | | Example 3 | |
| --- | --- | --- | --- | --- | --- | --- |
|  | Starting material | Product | Starting material | Product | Starting material | Product |
| Yield [%] | — | 79 | — | 76 | — | 62 |

[1]Proportion of vinylidene double bonds, according to $^{13}C$—NMR
[2]Determination by means of GPC (see above)
[3]Determined by means of GC (see above)

Preparation of the Functionalized Polyolefins

Example 4

395 g of polybutene from Example 1, 100 g of dodecane and 5 g of cobalt octacarbonyl are heated in an autoclave at 280 bar $CO/H_2$ (1:1) for 5 hours at 185° C. Thereafter, the mixture is cooled to room temperature, the catalyst is removed with 400 ml of 10% strength aqueous acetic acid and the reaction product is then washed neutral. The oxo product obtained is hydrogenated together with 0.1 l of ammonia and 300 g of ethanol and 100 g of Raney cobalt in an autoclave at a hydrogen pressure of 200 bar at 180° C. for 5 hours (reductive amination). Thereafter, the mixture is cooled to room temperature, the catalyst is filtered off, excess ammonia is evaporated and the solvent is separated off by distillation. 333 g of the amine-functionalized polybutene remain in 417 g of residue.

The functionalization yield of hydroformylation was 85%, and the conversion of the oxo product to amines was 94%. The amine number of the functionalized polybutene was 51. The amount of primary amine was 35% by weight, that of secondary amine 52% by weight, and that of tertiary amine 13% by weight. The results of the engine test are summarized in Table 2.

Example 5

380 g of distillation residue from Example 3 were hydroformylated similarly to Example 4 in the presence of 6 g of cobalt octacarbonyl and then subjected to reductive amination.

The functionalization yield of the hydroformylation was 86% and the conversion of the oxo product to the amines was 95%. The amine number of the functionalized polypropylene was 72. The amount of primary amine was 33% by weight, that of secondary amine 51% by weight and that of tertiary amine 16% by weight. The results of the engine test are summarized in Table 2.

Example 6

310 g of distillation residue from Example 3 were dissolved in 62 g of dodecane and hydroformylated similarly to Example 5. Then the reaction product was hydrogenated in the presence of Raney nickel at 190 bar hydrogen pressure and 190° C. The functionalization yield of the hydroformylation was 82%, while the CO number was <0.5 and the OH number was 111.

The resulting solution of the hydrogenated product was reacted with 51 g of phthalic anhydride in the presence of 0.4 g of tetraisopropyl orthotitanate, first for 2 hours at 220° C. and atmospheric pressure and then for 2 hours at 220° C. (bath temperature) and 2 mbar, excess dodecane being distilled off. After precipitation of the titanate with water and filtration, residual dodecane was distilled off at 230° C. and 2 mbar. 371 g of esterification product were obtained. The ester had an ester number of 96 and an acid number of <1.

Example 7

380 g of distillation residue from Example 3 were dissolved in 100 g dodecane and hydroformylated similarly to Example 4 in the presence of 6 g cobalt octacarbonyl ($Co_2(CO)_8$). The content of active compounds was about 65% (mixture of alcohol, aldehyde, formiate of alcohol and some carboxylic acid).

To the hydroformylation mixture were added 3,8 g KOH. The mixture was then heated to 130° C. Then 50 g of a mixture of dodecane and water were distilled off. Thereafter, the mixture was pressurized with 1160 g of 1,2-propylene oxide. After 6 hours the pressure dropped to about 2 bar. The mixture was cooled to 80° C. and pressure was released. Volatile products were evaporated by evacuation/aeration with nitrogen three times. Then 10 g of acidiction exchange resin were added, stirred for 30 min and removed by filtration over a filter having a pore size of 0,2 μm.

The polyether obtained had an OH-number of 32, a number average molecular weight $\overline{M}_N$ (GPC) of 1730 and a dispersity $\overline{M}_W/\overline{M}_N$ of <1,22.

Example 8

The polyether from Example 7 was reacted with ammonia/hydrogen in the presence of Raney cobalt similar to Example 4 (reductive animation). The reaction product had an amine number of 28.

The results of the engine test are summarized in Table 2.

TABLE 2

| Engine test | | |
|---|---|---|
| Additive | | Deposit |
| Example | ppm | mg |
| — | — | 327 |
| 4 | 200 | 9 |
| 5 | 200 | 11 |
| 6 | 300 | 59 |
| 7 | 300 | 47 |
| 8 | 300 | 28 |

We claim:

1. A polyolefin, obtained by catalytic dimerization of at least monounsaturated olefin oligomers which are homo- or cooligomers of $C_3$–$C_6$-olefins selected from propene, 1-butene, isobutene, 1-pentene, 2-methylbutene, 1-hexene, 2-methylpentene, 3-methylpentene or 4-methylpentene, optionally in combination with ethylene,
   wherein the polyolefin has a number average molecular weight of from 400 to 1500 dalton, has a dispersity $\overline{M}_W/\overline{M}_N<1.2$, and is at least monoethylenically unsaturated.

2. A polyolefin as claimed in claim 1, wherein the olefin oligomers have a number average molecular weight of from 200 to 400 dalton.

3. A polyolefin as claimed in claim 1, wherein at least 50% of the olefin oligomers have a terminal double bond.

4. A process for the preparation of a polyolefin as claimed in claim 1, wherein monounsaturated olefin oligomers having a dispersity $\overline{M}_W/\overline{M}_N<1.4$ are dimerized in the presence of an acidic catalyst and the catalyst is separated off after the end of the reaction.

5. A process as claimed in claim 4, wherein the acidic catalyst is $BF_3$ or a complex of $BF_3$ with an oxygen-containing compound.

6. A process as claimed in claim 5, wherein the oxygen-containing compound is a $C_1$–$C_8$-alcohol.

7. A process as claimed in claim 4, wherein the dimerization is carried out at from 0 to –100° C.

8. A functionalized polyolefin, obtainable by functionalizing a polyolefin which is obtained by catalytic dimerization of at least monounsaturated olefin oligomers, the polyolefin having a number average molecular weight of from 400 to 1500 dalton and a dispersity $\overline{M}_W/\overline{M}_N<1.2$ and being at least monoethylenically unsaturated, wherein the functionalized polyolefin is of the following formula (I):

wherein
R is the polyolefin radical, i is an integer from 1 to 4 and, when i is 1,
X is a functional group of the formula (II)

$$-(CH_2)_k-\left[\!\!\begin{array}{c}N-Y\\|\\R'\end{array}\!\!\right]_l-Z \quad (II)$$

wherein
k and l, independently of one another, are each 1 or 1,
R' is hydrogen, alkyl, hydroxyalkyl, aminoalkyl, cycloalkyl, aryl, aralkyl or —Y—Z,
—Y— is a group $$-[-Alk-O-]_p-Alk'- \quad \text{or}$$

$$-[-Alk-N(R'')-]_p-Alk'-$$

wherein
Alk and Alk' are identical or different and are each $C_2$–$C_4$-alkylene,
p is an integer from 0 to 10 and
R" is hydrogen, alkyl or aryl, and
Z is selected from amongst

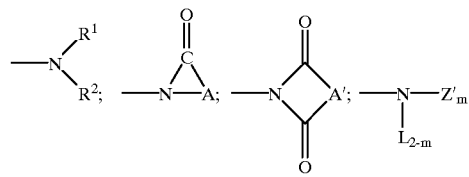

wherein
$R^1$ and $R^2$ independently of one another, are each hydrogen, alkyl, cycloalkyl, hydroxyalkyl, aryl or aralkyl and, if l is 0, may also be R and —$CH_2$—R, wherein R has the abovementioned meanings, or $R^1$ and $R^2$, together with the nitrogen atom to which they are bonded, form an unsubstituted or substituted heterocyclic structure which may contain a further heteroatom selected from the group consisting of oxygen and nitrogen,
A is $C_3$–$C_5$-alkylene which is unsubstituted or mono- or polysubstituted by alkyl, cycloalkyl, aryl, hetaryl, aralkyl, or hetaralkyl,
A' is $C_2$–$C_4$-alkylene, or $C_2$–$C_4$-alkenylene, both of which are unsubstituted or mono- or polysubstituted by alkyl, cycloalkyl, aryl, hetaryl, aralkyl or hetaralkyl, or is o-arylene, m is 1 or 2, L is hydrogen, alkyl, aryl, aralkyl, hetaryl or hetaralkyl and Z' is selected from amongst

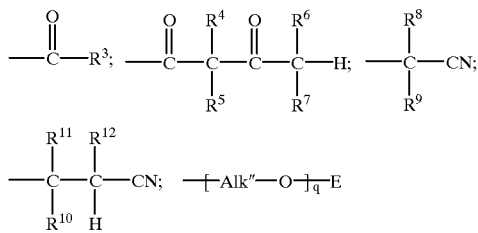

wherein $R^3$–$R^{12}$, independently of one another, are each hydrogen, alkyl, aryl, hetaryl, aralkyl or hetaralkyl, q is from 1 to 50 and Alk" is $C_2$–$C_4$-alkylene which is unsubstituted or hydroxyl-substituted and E is hydrogen or one ester equivalent of an aliphatic, aromatic or araliphatic mono-, di-, tri- or tetracarboxylic acid;

or X is a functional group of the formula (III)

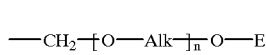 (III)

wherein n is an integer from 0 to 50,

Alk is a $C_2$–$C_4$-alkylene unit and

E has one of the abovementioned meanings;

or X is a functional group of the formula (IIIb)

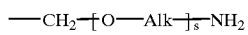 (IIIb)

wherein s is an integer from 1 to 50 and

Alk has one of the abovementioned meanings;

or X is a functional group of the formula (IV)

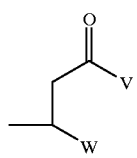 (IV)

wherein

V is alkyl, aryl, aralkyl, —O—$R^{13}$ or —$NR^{14}R^{15}$ and $R^{13}$ to $R^{15}$, independently of one another, may each be hydrogen, alkyl, which may furthermore be interrupted by one or more nonadjacent oxygen atoms or may also have $NH_2$— or OH-groups, or cycloalkyl, aryl, aralkyl, hetaryl or hetaralkyl, W may be hydrogen, alkyl, cycloalkyl, aryl, aralkyl, hetaryl or hetaralkyl, alkylcarbonyl, alkyloxycarbonyl, or alkylaminocarbonyl, or V and W, together with the carbonyl function on V, form a group

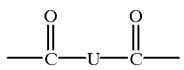

wherein

U is oxygen or $NR^{16}$, wherein $R^{16}$ may have the meanings stated for $R^{13}$–$R^{15}$;

or, if i is from 2 to 4, X is a group of the formula (V)

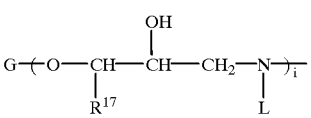 (V)

wherein G is derived from a di-, tri- or tetravalent aliphatic radical, L has the abovementioned meanings and $R^{17}$ is hydrogen or $C_1$–$C_4$-alkyl.

9. A functionalized polyolefin as claimed in claim 8, represented by the formula (VI):

R—$CH_2$—$NR^aR^b$ (VI)

wherein R is as defined in claim 8 and $R^a$ and $R^b$ independently of one another, may be hydrogen, alkyl, which may be interrupted by one or more non-adjacent amino groups or oxygen atoms, cycloalkyl, which may also have heteroatoms in the ring, aryl, aralkyl, hetaryl or hetaralkyl, or $CH_2$—R.

10. A functionalized polyolefin as claimed in claim 8, represented by the formula (VII):

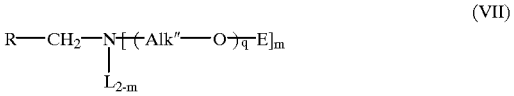 (VII)

wherein R, L, E, m and q are defined in claim 8 and Alk" is 1,2-ethylene, 1,2- or 2,3-propylene or 1,2- or 3,4-butylene.

11. A functionalized polyolefin as claimed in claim 8, represented by the formula (VIII):

R—$CH_2$—O—E (VIII)

wherein R and E are as defined in claim 8.

12. A functionalized polyolefin as claimed in claim 8, represented by the formula (XIV):

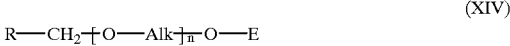 (XIV)

wherein R, Alk and E are as defined in claim 8 and n is an integer from 11 to 50.

13. A functionalized polyolefin as claimed in claim 8, represented by the formula (XIVb):

 (XIVb)

wherein R and Alk are as defined in claim 8 and s is an integer ranging from 10 to 40.

14. An additive mixture for fuels or lubricants, containing at least one compound as claimed in claim 1, optionally in combination with conventional fuel or lubricant additives.

15. An additive mixture for fuels or lubricants, containing at least one compound as claimed in claim 8, optionally in combination with conventional fuel or lubricant additives.

16. A lubricant composition comprising, in a conventional liquid or pasty lubricant, at least one compound as claimed in claim 1 in a total amount of from 1 to 15% by weight, based on the total weight of the composition, optionally in combination with additional lubricant additives.

17. A lubricant composition comprising, in a conventional liquid or pasty lubricant, at least one compound as claimed in claim 8 in a total amount of from 1 to 15% by weight, based on the total weight of the composition, optionally in combination with additional lubricant additives.

18. A fuel composition comprising, in a conventional fuel, at least one compound as claimed in claim 1, in a total concentration of from about 20 to 5000 mg/kg of fuel, optionally in combination with further conventional fuel additives.

19. A fuel composition comprising, in a conventional fuel, at least one compound as claimed in claim 8, in a total concentration of from about 20 to 5000 mg/kg of fuel, optionally in combination with further conventional fuel additives.

* * * * *